C. MÜLLER.
CIGAR MACHINE.

No. 188,934. Patented March 27, 1877.

Witnesses. Charles Müller
Inventor.

UNITED STATES PATENT OFFICE.

CHARLES MÜLLER, OF ALBANY, NEW YORK.

IMPROVEMENT IN CIGAR-MACHINES.

Specification forming part of Letters Patent No. 188,934, dated March 27, 1877; application filed September 28, 1876.

*To all whom it may concern:*

Be it known that I, CHARLES MÜLLER, of Albany, county of Albany, State of New York, have invented certain Improvements in Knife-Slats for Cigar-Machines, and I do hereby declare that the following is a description thereof, reference being had to the accompanying drawings, forming a part of this specification, in which—

Figure 1:
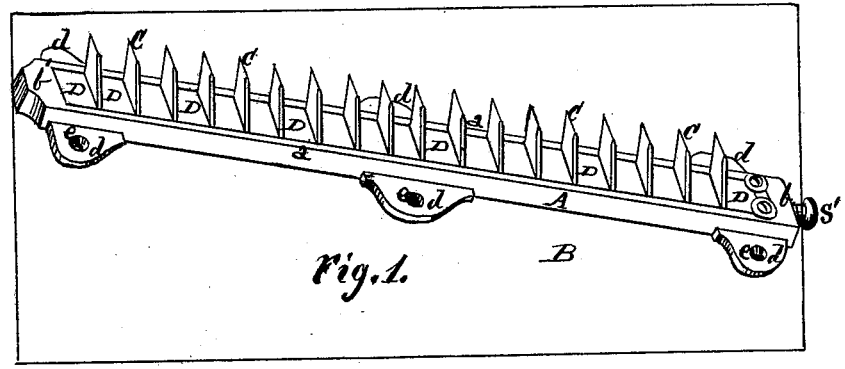
Figures 2, 3, 4:
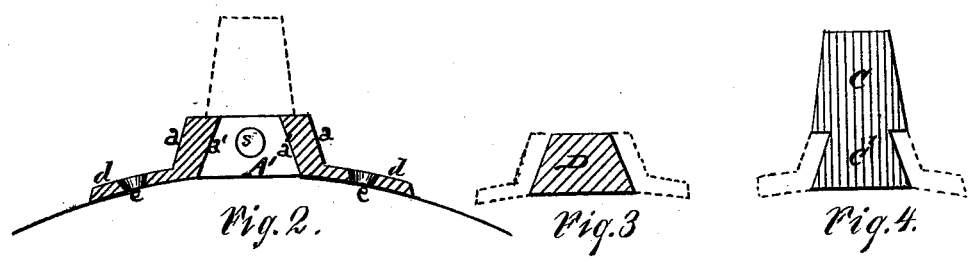
Figure 5:
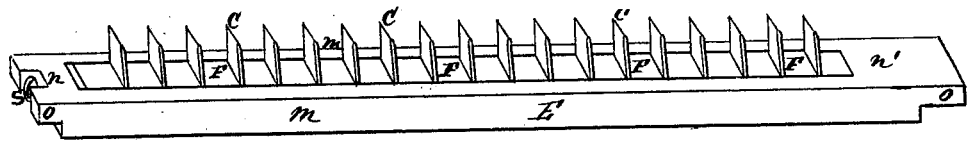
Figure 6:
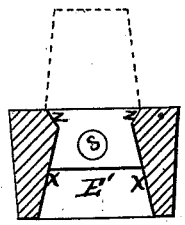
Figure 7:
Figure 8:
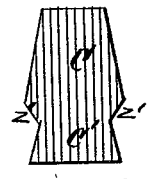
Figure 9:
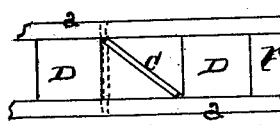

Figure 1 represents a perspective view of the improved knife-slat. Fig. 2 is a cross-sectional view of the same. Fig. 3 is a side elevation of the division-block employed between the knives. Fig. 4 is a side elevation of the knife employed. Fig. 5 is a perspective view of the knife-slat, modified in the form of its parts. Fig. 6 is a cross-sectional view of the same. Fig. 7 is a representation of a modification of the form of division-block shown in Fig. 3. Fig. 8 illustrates the knife in a modified form, to correspond with the modified form of slat or bar and its division-block. Fig. 9 is a plan view, illustrating the manner in which the knives may be inserted or re-removed.

My invention relates to knife-slats for cigar-machines, and consists of the combination of parts hereinafter described and set forth. The object of this invention is to secure knives in the slats or bars of cigar-machines, made with the improvements secured to myself by Letters Patent No. 96,257, granted October 26, 1869, in such a manner that when any one or more of said knives have been broken or otherwise injured they may be readily removed and replaced.

In the drawings, A, Figs. 1 and 2, represents the slat or bar intended to hold the several knives. The said slat or bar is composed of the two parallel sides $a\,a$, ends $b\,b$ cast solid with said sides, and the lugs $d\,d$, provided with screw-holes $c$ or equivalent known devices for attachment to the cylinder B.

C C are knives having the form shown in Figs. 4 and 8, and provided with a shank, $C'$, made with incline side edges. The inner and opposite facing-surfaces $a'\,a'$ of the sides $a\,a$ of the slat or bar A are made also inclined, as shown in Fig. 2 by full lines, and in Fig. 4 by dotted lines, and correspond with the form of the shank $C'$ of the knives C, that when the knives by their shanks are set in the said bar they may be made to be held in place against being drawn out by a form of dovetail joint.

D D are division-blocks intended to separate the said knives and preserve them upright. The said blocks are made each with a length equal to the distance the knives are to be kept apart, and have their ends setting against the knives, square or at right angles with the top surface, while their sides are made inclined, to correspond with the inclined sides $a'\,a'$ of the pieces $a\,a$ of the bar A, and inclined edges of the shank $C'$ of the knives.

$S'$ is a set-screw working into a screw-threaded hole made in one of the ends of the frame A, as shown. When the several knives and blocks are properly placed in position, as shown in Fig. 1, the set-screw is to be turned inward to tighten the said knives and blocks in the slat or bar. When a knife is to be removed the said set-screw is to be turned out to a distance sufficient to permit the removal of the block contiguous to said set-screw, when the several other remaining division-blocks, and the knives may be readily shoved to the distance of the length of a block toward the set-screw, so that any two blocks may be separated and permit a knife to be turned oblique in the space between, as shown in Fig. 9.

If desired, the slat or bar may be made in the form of E, Figs. 5 and 6, in which case the inner and opposite facing-surfaces of the side pieces $m\,m$ of said figures are made with inclines $x$ and $z$, and the lugs $d$ and screw-hole $e$ are dispensed with, and tenoned ends $o\,o$ are substituted and adapted to interlock with suitable pieces made with the machine it is to be used with. When the sides are made with inclines $x\,x$ and $z\,z$, the division-blocks F are to have their edges made to correspond with the said inclines, so as to be capable of locking with the same, while the shanks of the knives have given to them the inclined shoulders $z'$ $z'$, as shown in Fig. 8.

When it is desired to insert the knives C in the slat or frame A or its modification E, the several division-blocks are to be first placed within the space $A'$ or $E'$, so as to nearly fill the entire length of the space of the said slat. The division-blocks are then to be successively separated one from the other, as shown in Fig. 9, when the knives may be readily placed in position between the blocks, as they are successively separated by dropping each knife down with its shank in the space A' of the slat-frame A or E', of the modification E, in an oblique manner, as shown in Fig. 9, and then turning the knife straight, as indicated by dotted lines in the same figure. When each knife has been thus placed, and the slat-frame has been filled, the last-block is to be inserted, and the set-screw $s$ is to be tightened on the same, when the several blocks and knives will be firmly and securely held in place. When it is desired to remove any one of the knives a reverse operation is to be had.

By the improvements in this invention any one or more knives may be readily removed and replaced without removing the slat-bar from its place in the machine.

Having described my invention, what I claim, and desire to secure by Letters Patent, is—

In combination, with the slat-frame A, or its described equivalent, of the division-blocks D and knives C, made with the forms described, and the set-screw S', substantially as and for the purpose set forth.

CHARLES MÜLLER.

Witnesses:
DEXTER REYNOLDS,
ALEX. SELKIRK.